UNITED STATES PATENT OFFICE.

THOMAS J. MAYALL, OF ROXBURY, MASSACHUSETTS.

IMPROVEMENT IN RESTORING WASTE RUBBER.

Specification forming part of Letters Patent No. 34,309, dated February 4, 1862.

*To all whom it may concern:*

Be it known that I, THOMAS J. MAYALL, of Roxbury, in the county of Norfolk and State of Massachusetts, have invented certain new useful Improvements in Method of Restoring Waste Vulcanized or Hermized India-Rubber; and I do hereby declare that the following description is a full and exact specification of the same, wherein I have set forth the nature and principles of my said improvements by which my invention may be distinguished from all others of a similar class, together with such parts as I claim and desire to have secured to me by Letters Patent.

My improvements consist in restoring old waste vulcanized, hermized, or metallic india-rubber, which has once served the purposes for which it was intended and become useless, to such a plastic condition that it can be reworked and used again for the manufacture of the various articles of trade and commerce. This result I accomplish by mixing vegetable tar or the substance known as "pine oil" with waste vulcanized or hermized rubber ground to such a consistency as to facilitate the combination of the two. This mixture I have discovered will produce such a pasty compound of rubber as to render it, either by sunning or other gentle heat or by a vulcanizing-heat, available for working into the many useful articles which are usually made of india-rubber.

It will be evident that there are many modes by which vegetable tar and pine oils and waste vulcanized or hermized rubber can be incorporated with each other; but I prefer to take the waste rubber and grind the same by any suitable machinery to a fine state or sheet by the ordinary rubber grinding or mulling mill. I then take about five-eighths of the old rubber thus ground to three-eighths of vegetable tar or pine oils and mix them thoroughly together in any proper manner. The whole may then be rolled into sheets or molded into various forms, and then submitted to a gentle heat, or, if desirable, to a vulcanizing-heat.

The proportions of the tar or pine oil and the old rubber can of course be varied according to the kind and quality of goods to be manufactured.

The heating may consist simply of exposure to the sun and air, or may be effected by the use of ordinary dry heaters, by steam heat, or by superheated steam, or the hermizing or freezing process may be applied.

If desirable, native rubber and sulphur may be mixed, either separately or in combination, with the above-described compound, and the whole may then be vulcanized.

By this new process old waste vulcanized or hermized rubber can be easily reduced to such a plastic and homogeneous mass as to be readily reworked into various useful articles at a comparatively trifling cost.

"Pine oil" is the name given in the United States of America to a thick lassy oil which is produced in the manufacture of rosin-oil, and is of different grades of purity. All the grades known are useful in the process described.

Having thus described my improvements, what I claim as my invention, and desire to have secured to me by Letters Patent, is—

The combining or incorporating of waste vulcanized, metallic, or hermized rubber with vegetable tar or pine oils, for the purpose and substantially in the manner as set forth.

THOS. J. MAYALL.

Witnesses:
JOSEPH GAVETT,
A. W. BROWN.